April 26, 1966  J. C. FOSTER  3,247,782
BALER FOR TRASH, LEAVES, PAPER AND THE LIKE
Filed April 13, 1964
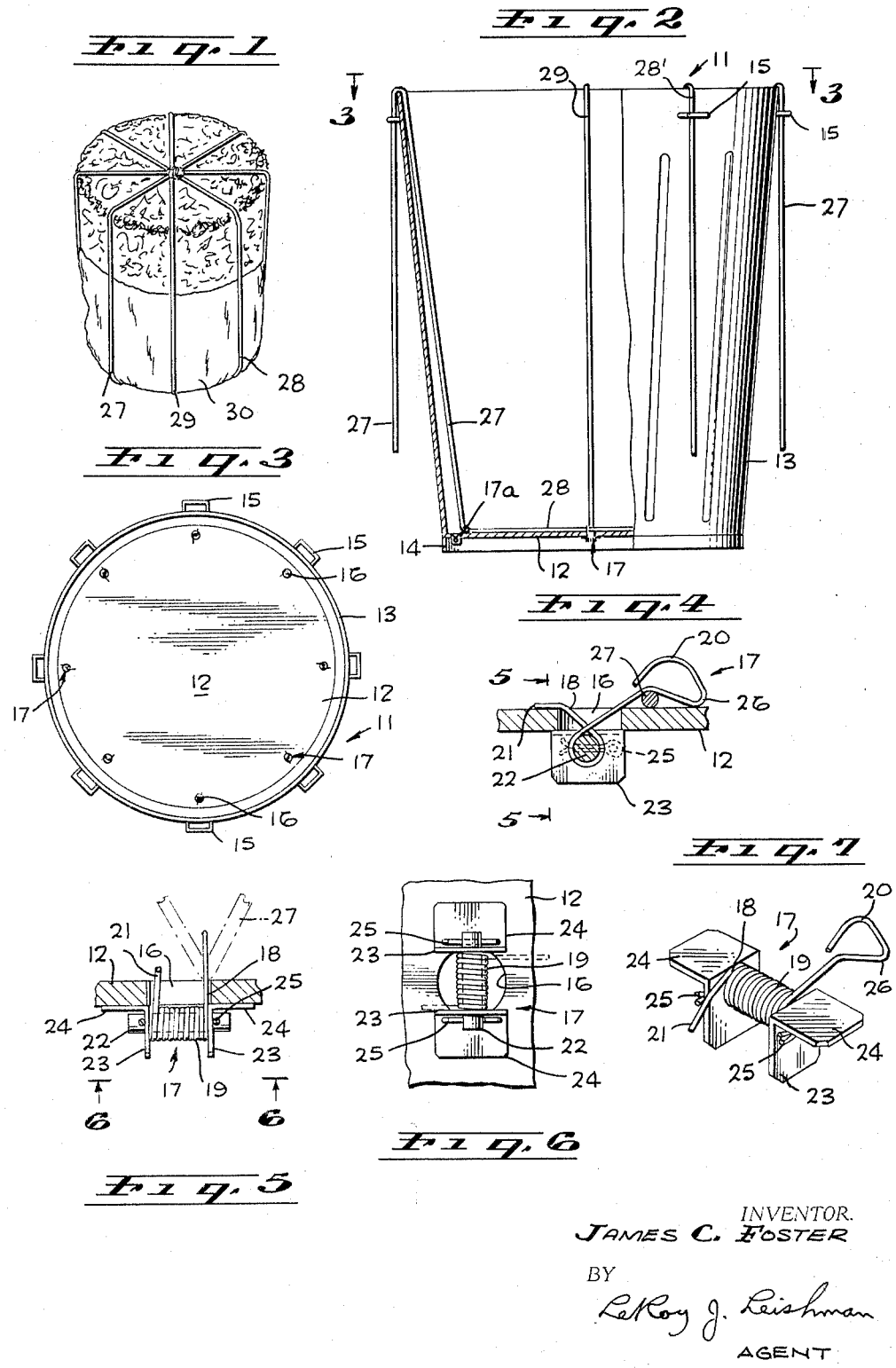
INVENTOR.
JAMES C. FOSTER
BY
LeRoy J. Leishman
AGENT United States Patent Office 3,247,782
Patented Apr. 26, 1966

3,247,782
BALER FOR TRASH, LEAVES, PAPER
AND THE LIKE
James C. Foster, 3736 W. 109th St., Inglewood, Calif.
Filed Apr. 13, 1964, Ser. No. 359,177
4 Claims. (Cl. 100—34)

The invention herein described pertains to bailing equipment and more particularly to a simple baler for trash, leaves, clippings, newspapers and the like.

Balers have long been available for a variety of purposes. Those intended for industrial use are relatively complex, but some balers of simpler construction have been developed for use by the home owner for bailing such things as newspapers and clippings. Most of the latter, however, have still been too complicated and expensive to come into general use. It is accordingly one object of the present invention to provide a baler of simpler construction than any that has heretofore been available.

Another object is to provide a baler especially to be used with ropes, cord or twine that will embody easily accessible means for holding the ropes, cords or twine in place until the material to be baled has been placed in a suitable holder and until the cords or the like are ready to be cinched around the mass of material and tied so that the material will be held together in a compact bundle.

A further object is to provide a baler of such design that the cords or twine will be released automatically from the positions in which they have temporarily been held when the cords are pulled upward from the bottom of the receptacle in which the material to be baled is placed.

An additional object is to provide a baler of such design that it may readily be constructed from a garbage can or other bucket-shaped container.

Still another object is to provide simple fastening or hooking devices for temporarily holding the baling cords, a part of each device to be located within the can and a part under the bottom thereof, such devices being installable by means of holes that may be made in the bottom of the can.

This invention possesses many other advantages, and has other objects which may be made more clearly apparent from a consideration of one embodiment of the invention. For this purpose such an embodiment is shown in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

In the drawings:

FIGURE 1 is a perspective view of a mass of material as baled with the aid of one embodiment of the invention herein described;

FIG. 2 is an elevation partly broken away, of the said embodiment of said invention;

FIG. 3 is a view taken on line 3—3 of FIG. 2;

FIG. 4 is a cross-section taken through a portion of the base of the embodiment shown in FIGS. 2 and 3, revealing certain structural details;

FIG. 5 is a view taken on line 5—5 of FIG. 4;

FIG. 6 is a bottom view taken on line 6—6 of FIG. 5; and

FIG. 7 is an isometric view of the cord-hooking device shown in FIGS. 4, 5 and 6.

The invention shown in the figures in one of its embodiments may be utilized for producing bales of any desired shape, such as polygonal with four or more peripheral sides, or oval or round. The shape of the receptacle of course determines the shape of the bale formed therein.

In the illustrated embodiment, the receptacle 11 is a garbage or trash pail that has been converted into a baler embodying the present invention. The receptacle comprises a base 12 and an outer wall structure 13 surrounding the base. It is desirable that there be a short outer flange or lip 14 extending downward around the base. This flange may be integral with the base or with the side structure 13, or, in certain possible embodiments, with both.

In the presently preferred form, the receptacle is provided with a plurality of cord-fastening means spaced around it for holding the top portions of the cords that are to be used for binding the bale. Inasmuch as each cord has two ends, there are an even number of these cord-fastening means, each disposed directly across from one of the others. If the receptacle is round, as illustrated in FIGS. 2 and 3, this will mean that each fastening means is located diametrically across from one of the others.

These fasteners may be placed either on the outside or inside of the receptacle. However, if they are located on the inside they must be placed sufficiently near the top of the receptacle to be above the level of the mass that is to be baled. When the fastening means are located on the outside of the receptacle, it is mechanically somewhat immaterial whether they be placed near the top or at some distance down the side, as cords that are fastened exteriorly must necessarily extend upward and over the receptacle's top edge and then downward on the inside, thus producing the same end result as if they were placed on the inside near the top. This arrangement makes it possible to fill the receptacle to the top, or even slightly beyond, as the cords may be extended up and over a heaping mass and then cinched and tied together to produce a compact bundle.

When the receptacle is round, it is of course preferable that the fastening means be equally spaced.

A plurality of holes 16 are provided in the base 12 in proximity to the wall structure 13. These holes should be the same in number as the fastening means, and it is preferable that a radial plane passing through the holes also pass through the respectively associated fastening means. A plurality of hooking devices 17 are mounted near the juncture of the base 12 and the wall structure 13, each one in the presently preferred embodiment being attached by means of one of the aforementioned holes 16. The manner in which these hooking devices are mounted will be more readily apparent if the construction of the hooking devices is first explained. A piece of spring wire 18 having its central portion wound into a helix 19 has one end formed into a loop 20 and its other end extending out sufficiently far tangentially from the loop 20 to be formed into an abutting end 21 (FIG. 4). A short shaft 22 that extends through the helix 19 has its opposite ends respectively mounted in one of a pair of brackets 23. These brackets each have an outwardly extending flange 24. The shaft 22 is held in position with respect to the brackets 23 by any appropriate means, such as the cotter pins 25 extending through the outer ends of the shaft. Snap rings positioned in annular grooves in the shaft will of course serve the same purpose.

When the hooking devices 17 are properly mounted, they hold themselves in position. Their installation is effected from the bottom of the base 12, the two end portions 26 and 21 of the specially formed spring wire 18 both being inserted through the hole 16 from the underside of the base. The spring tension of the wire causes it to assume the position shown in FIG. 4, where the end 21 abuts the top surface of the base 12, as does the lower portion 26 of the loop 20. The flanges 24 are held firmly against the bottom surface of the base 12 by the tension of the spring wire.

In using the baler hereinbefore described, the cords that are to bind the mass of loose material into a compact bale must first be placed and fastened in the required positions. Such a cord 27 is shown connected to the fastening means 15 on the left outer surface of the receptacle as shown in FIG. 2, and it is then spread downward on the inside of the receptacle toward the fastener 17a in the lower left hand corner. Here the cord 27 is hooked under the spring-biased portion 26, as shown in FIG. 4, from whence it is spread across the lower portion of the receptacle as indicated at 28 in FIG. 2. The cord must be fastened in a similar manner to the hooking device that is diametrically opposite from the device 17a. From there it must be brought upward on the inside surface opposite from the surface where the cord extends in a downward direction. After ascending the last mentioned inner surface of the peripheral wall structure 13, the cord must be cast over the top edge of the receptacle and then appropriately engaged with the fastening means 15 that is diametrically opposite from the identical fastening means on the left side of the receptacle. The right end of the cord 27 may be left dangling, as shown in FIG. 2.

When using this particular embodiment of the invention, other cords must be similarly laced and threaded through oppositely disposed fastening means 15 with the intervening portions of the cords hooked in the bottom of the receptacle under the particular hooking members 17 that are respectively in substantially the same vertical planes as the particular fastening means that hold the top portions of the cord. The outer end of one such cord 28 is shown in FIG. 2, while another cord 29 is shown extending down the inside of the receptacle where the wall structure is broken away to reveal the internal arrangement. FIGS. 1, 2 and 3 illustrate the use of four cords requiring four pairs of fastening devices 17, or eight of them in all.

The spring tension of the wire 18, as will be obvious from an examination of FIG. 4, causes the looped end 26 of the wire to pass down against the top surface of the base 12, and it likewise causes the opposite end 21 of the spring form to abut against the top surface of the base on the opposite side of the opening 16. The fastener is thus spring-biased to a position in which the cord 27 is releasably hooked under the looped portion 26 of the wire.

It will readily be understood by those skilled in the use of spring-loaded devices that other spring-loaded hooking arrangements may be substituted for the particular type illustrated and hereinbefore described, the important requirement being that the hooking means be such that the cord will automatically be released in substantially the manner hereinafter described. After all the cords that are to be used have been appropriately secured in some manner near the top of the bale and spread across the base and secured near the junctures of the base and the side wall structure, the receptacle is ready for filling unless the individual items making up the mass that is to be baled are individually so small that they might drop out of the ultimate bale between the cords. When this hazard is present, a piece of paper, net or other suitable material 30 (FIG. 1) is first placed in the bottom of the receptacle over the horizontal portions 28 of the cords before any of the balable material is placed in the container.

After the container has been filled to the desired level, the upper ends of the cord 27 are detached from the holding or fastening means 15 and then laid over the top of the contents. The two ends of each cord are then brought together and pulled tight around the contents of the receptacle, and then tied. This cinching of the cords, depending upon the compactness of the material in the receptacle, may cause the cords to pull upward on the spring-biased portions 26 of the various fastening means 17, causing the movable loop portion to turn in a counterclockwise direction (when viewed from the position shown in FIG. 4) until the cord slips from under the looped portion. After the opposite ends of the respective cords have been cinched and tied in the manner just described, the bale is ready to be lifted, preferably by means of the cords, from the receptacle. If the cinching of the various cords has not in itself supplied sufficient tension to the cords to cause them to become unhooked from the movable portion 26 of the respective hooking devices, the lifting of the bale from the receptacle will of course bring this about.

It will be apparent that the function of the fastening means 15 is merely to hold up the top portions of the various cords so that the balable material will occupy the region between the elevated portions of the cords and above the horizontal sections 28. It is thus not necessary that the cords be very rigidly secured to the fastening means 15; in fact, if the cords are sufficiently heavy it is possible to dispense with the fastening means 15 and rely upon the weight of the dangling ends of the cords and the friction of the cord with the top edge of the receptacle to hold the cords in place.

As previously mentioned, it is of course not essential that the receptacle be round, this configuration being merely one of several that are entirely satisfactory.

Many other modifications will of course suggest themselves, and the various elements and components may be replaced by others performing the same or similar functions, and they may be rearranged and transposed—all without departure from the broad spirit of the invention as succinctly set forth in the appended claims.

The inventor claims:

1. A baler including: a receptacle having a horizontal base and a peripherally disposed upright structure attached thereto for confining the contents of the receptacle; a plurality of hooking devices each mounted in said receptacle adjacent said base and said structure and opposite from another of said devices, each of said devices comprising (a) a relatively short shaft that is anchored at least indirectly to the under side of said base and (b) a piece of spring wire at least partially coiled around said shaft, the opposite end portions of said piece of wire extending from said shaft through a hole in said base, one of said end portions being immovably held against the upper surface of said base by the spring tension of the wire, and the other end portion having an involute bend therein that is yieldingly held in a first position against the upper portion of said base by the spring tension of the wire, there being an arch in said wire between said bend and said hole under which a cord suspended from above may be releasably hooked, each of said devices acting to release said cord when said bend is moved to a second position against the action of the spring wire in response to a pull from above upon said cord; said base and upright structure cooperating to give shape and form to such mass of balable material as may be resting within said receptacle upon such cords as may be entending across said base between oppositely disposed devices, so that the cords when cinched around said mass and tied at their opposite ends will bind the mass into a compact bundle whose extraction from the receptacle will effect the release of the cords from the devices under whose arches they were releasably hooked.

2. The combination of claim 1 in which said shaft is longitudinally positioned by a pair of brackets located on opposite sides of said piece of wire.

3. The combination of claim 2 in which said structure extends at least a relatively short distance below said base to raise said shafts, said brackets, and the coiled portions of said pieces of wire from the surface on which said structure may be resting.

4. The combination of claim 1 in which said structure extends at least a relatively short distance below said base to raise the shafts and the pieces of wire coiled therearound from engagement with the surface on which said structure may be resting.

References Cited by the Examiner

UNITED STATES PATENTS

| | | | |
|---|---|---|---|
| 1,142,188 | 6/1915 | Macomber | 100—34 |
| 1,160,479 | 11/1915 | Westenhiser | 100—34 X |
| 2,485,419 | 10/1949 | Thompson | 100—34 |
| 2,636,432 | 4/1953 | Sherer | 100—34 |
| 2,933,277 | 4/1960 | Messier | 24—66 X |

WALTER A. SCHEEL, *Primary Examiner.*